United States Patent
Koube et al.

(10) Patent No.: US 7,348,380 B2
(45) Date of Patent: Mar. 25, 2008

(54) POLYESTER PLASTICIZER AND CHLORINE-CONTAINING RESIN COMPOSITIONS

(75) Inventors: Shinji Koube, Saitama (JP); Kiyotatsu Iwanami, Saitama (JP); Teruo Arai, Saitama (JP); Tomoki Honda, Saitama (JP)

(73) Assignee: Adeka Corporation, Tokyo (JP)

( * ) Notice: Subject to any disclaimer, the term of this patent is extended or adjusted under 35 U.S.C. 154(b) by 163 days.

(21) Appl. No.: 10/534,381

(22) PCT Filed: Oct. 29, 2003

(86) PCT No.: PCT/JP03/13857

§ 371 (c)(1),
(2), (4) Date: May 9, 2005

(87) PCT Pub. No.: WO2004/041903

PCT Pub. Date: May 21, 2004

(65) Prior Publication Data

US 2006/0025544 A1    Feb. 2, 2006

(30) Foreign Application Priority Data

Nov. 8, 2002   (JP) .............................. 2002-325976

(51) Int. Cl.
*C08L 67/00* (2006.01)
*C08L 101/04* (2006.01)
*C08G 63/16* (2006.01)

(52) U.S. Cl. ...................... 525/173; 525/173; 524/569; 524/314; 528/272; 528/302

(58) Field of Classification Search ................ 525/173; 524/569, 314; 528/272, 302
See application file for complete search history.

(56) References Cited

U.S. PATENT DOCUMENTS

| | | | | |
|---|---|---|---|---|
| 4,122,057 A | * | 10/1978 | Lamont et al. | 524/311 |
| 6,111,004 A | * | 8/2000 | Biesiada et al. | 524/311 |
| 2003/0114564 A1 | * | 6/2003 | Lang et al. | 524/315 |

FOREIGN PATENT DOCUMENTS

| | | | |
|---|---|---|---|
| JP | 61-78827 | | 4/1986 |
| JP | 61078827 A | * | 4/1986 |
| JP | 8-59938 | | 3/1996 |
| JP | 08059938 A | * | 3/1996 |
| JP | 2002-265861 | | 9/2002 |

OTHER PUBLICATIONS

English translation of JP 08059938A.*
English translation of abstract of JP 610788A.*

* cited by examiner

*Primary Examiner*—Randy Gulakowski
*Assistant Examiner*—Alicia M. Toscano
(74) *Attorney, Agent, or Firm*—Young & Thompson

(57) ABSTRACT

A polyester plasticizer which is obtained by reacting a diol component (a) consisting of 100 parts by mole of 2-methyl-1,3-propanediol, 10 to 1000 parts by mole of 3-methyl-1,5-pentanediol and 0 to 1000 parts by mole of other aliphatic diol with an organic dicarboxylic acid components (b) consisting of 100 parts by mole of adipic acid and 0 to 100 parts by mole of other organic dicarboxylic acid and a chain terminator (c) consisting of a monovalent aliphatic alcohol or a monovalent aliphatic organic acid and which has an average molecular weight of 500 to 5000. This plasticizer is excellent in plasticizing efficiency and can impart excellent oil resistance to synthetic resins such as chlorine-containing resins.

3 Claims, No Drawings

POLYESTER PLASTICIZER AND CHLORINE-CONTAINING RESIN COMPOSITIONS

TECHNICAL FIELD

The present invention relates to a specific polyester plasticizer and a chlorine-containing resin composition that contains the plasticizer. More particularly, it relates to a polyester plasticizer obtained by the reaction of a diol component essentially containing 2-methyl-1,3-propanediol and 3-methyl-1,5-pentanediol, an organic dicarboxylic acid component essentially containing adipic acid, and a chain terminator, and to a chlorine-containing resin composition that contains the plasticizer.

BACKGROUND ART

Polyester compounds obtained from aliphatic diols and aliphatic dicarboxylic acids are useful as plasticizers for synthetic resins and have been widely applied particularly to chlorine-containing resins, such as vinyl chloride resins.

A polyester plasticizer providing improved low temperature flexibility that is prepared by using 2-methyl-1,3-propanediol as an aliphatic diol is disclosed in JP-A-61-78827. However, the proposed polyester plasticizer has low plasticization efficiency and fails to impart sufficient oil resistance to chlorine-containing resins.

DISCLOSURE OF THE INVENTION

An object of the present invention is to provide a polyester plasticizer superior in plasticization efficiency and capable of imparting high oil resistance to synthetic resins, such as chlorine-containing resins, and a chlorine-containing resin composition containing the polyester plasticizer.

As a result of extensive investigations, the present inventors have found that the above object of the invention is accomplished by a polyester compound obtained from specific materials.

Having been reached based on the above finding, the present invention provides a polyester plasticizer having an average molecular weight of 500 to 5000 which is obtained by the reaction of (a) a diol component comprising 100 molar parts of 2-methyl-1,3-propanediol, 10 to 1000 molar parts of 3-methyl-1,5-pentanediol, and 0 to 1000 molar parts of an additional aliphatic diol, (b) an organic dicarboxylic acid component comprising 100 molar parts of adipic acid and 0 to 100 molar parts of an additional organic dicarboxylic acid, and (c) a chain terminator comprising a monovalent aliphatic alcohol or a monovalent aliphatic organic acid.

The present invention also provides a chlorine-containing resin composition comprising 100 parts by mass of a chlorine-containing resin, 10 to 100 parts by mass of the polyester plasticizer, and 0 to 100 parts by mass of other additives.

BEST MODE FOR CARRYING OUT THE INVENTION

The modes for carrying out the present invention will be described in detail.

The polyester plasticizer of the present invention is obtained by allowing to react (a) a diol component, (b) an organic dicarboxylic acid component, and (c) a chain terminator.

The diol component (a) is an aliphatic diol mixture containing 2-methyl-1,3-propanediol and 3-methyl-1,5-pentanediol as essential components and optionally containing other aliphatic diols.

The other aliphatic diols include ethylene glycol, 1,2-propanediol, 1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol.

The proportion of 3-methyl-1,5-pentanediol in the diol component (a) is 10 to 1000 molar parts, preferably 10 to 200 molar parts, still preferably 20 to 100 molar parts, per 100molar parts of 2-methyl-1,3-propanediol. If the proportion is less than 10 molar parts, sufficient low temperature flexibility is not assured. Use of more than 1000 molar parts impairs the oil resistance.

The amount of the other aliphatic diols in the diol component (a) is 0 to 1000 molar parts, preferably 0 to 500 molar parts, still preferably 0 to 200 molar parts, per 100 molar parts of 2-methyl-1,3-propanediol. If the amount exceeds 1000 molar parts, high plasticization efficiency and excellent oil resistance are not secured.

The organic dicarboxylic acid component (b) contains adipic acid as an essential component and other organic dicarboxylic acids as an optional component(s).

The other organic dicarboxylic acids include aliphatic dicarboxylic acids, such as oxalic acid, malonic acid, succinic acid, glutaric acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, and a hydrogenated dimer acid; aromatic dicarboxylic acids, such as phthalic acid, terephthalic acid, isophthalic acid, orthophthalic acid, and naphthalenedicarboxylic acid; and alicyclic dicarboxylic acids, such as 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, and 1,4-dicarboxylmethylenecyclohexane.

The other organic carboxylic acids can be used in an amount of 0 to 100 molar parts, preferably 0 to 50 molar parts, still preferably 0 to 20 molar parts, per 100 molar parts of adipic acid. If the amount exceeds 100 molar parts, high plasticization efficiency and excellent oil resistance are not assured.

The chain terminator (c) comprises a monovalent aliphatic alcohol or a monovalent aliphatic organic acid. Examples of the aliphatic alcohol are methanol, ethanol, 1-propanol, 2-propanol, butanol, 2-butanol, isobutyl alcohol, tert-butyl alcohol, amyl alcohol, hexanol, isohexanol, heptanol, 2-heptanol, octanol, isooctanol, 2-ethylhexanol, nonanol, isononanol, decanol, isodecanol, undecanol, isoundecanol, dodecanol, benzyl alcohol, 2-butyloctanol, 2-butyldecanol, 2-hexyloctanol, 2-hexyldecanol, stearyl alcohol, 2-octyldecanol, 2-hexyldodecanol, 2-octyldodecanol, 2-decyltetradecanol, tridecyl alcohol, and isotridecyl alcohol. These compounds can be used either individually or as a mixture of two or more thereof.

The monovalent aliphatic organic acid includes formic acid, acetic acid, propionic acid, butyric acid, isobutyric acid, valeric acid, caproic acid, caprylic acid, 2-ethylhexanoic acid, pelargonic acid, capric acid, neodecanoic acid, undecanoic acid, lauric acid, tridecanoic acid, myristic acid, pentadecanoic acid, palmitic acid, margaric acid, stearic acid, and coconut oil fatty acid. These compounds can be used either individually or as a mixture of two or more thereof.

The polyester plasticizer of the present invention that is obtained by allowing to react the diol component (a), the organic dicarboxylic acid component (b), and the chain terminator (c) has an average molecular weight of 500 to 5000, preferably 500 to 3000, still preferably 1000 to 3000. If the molecular weight is smaller than 500, the plasticizer invites such problems as volatilization, bleed out, and migration. If the molecular weight is greater than 5000, compatibility and flexibility deteriorate.

The viscosity of the polyester plasticizer according to the invention is not particularly limited and arbitrarily adjustable according to the intended use and the method of use. For application to a chlorine-containing resin, the polyester plasticizer of the present invention usually has a viscosity of 100 to 5000 mPa.s and preferably has an acid value of 1 or smaller and a hydroxyl value of 30 or smaller.

The manner of allowing the diol component (a), the organic dicarboxylic acid component (b), and the chain terminator (c) to react with each other to produce the polyester plasticizer of the invention is not particularly restricted. Well-known processes for producing polyester plasticizers can be applied. Such processes include (i) direct condensation between the diol and the organic dicarboxylic acid components, (ii) ester interchange between the diol and a lower alkyl ester of the organic carboxylic acid, and (iii) condensation between the diol and a halide of the organic carboxylic acid. These reactions can be carried out either in the absence or presence of a catalyst for esterification. The chain terminator (c) participates in the reaction through a similar esterification reaction. The molar ratio of the diol component (a), the organic dicarboxylic acid component (b), and the chain terminator (c) is arbitrarily decided so as to result in a molecular weight of 500 to 5000.

The esterification catalyst includes acid catalysts, such as sulfuric acid, phosphoric acid, zinc chloride, benzenesulfonic acid, p-toluenesulfonic acid, and 4-chlorobenzenesulfonic acid; titanium alkoxides, such as titanium tetramethoxide, titanium tetraethoxide, and titanium tetraisopropoxide; acylated titanium compounds, such as polyhydroxytitanium stearate and polyisopropoxytitanium stearate; titanium chelate compounds, such as titanium acetylacetate, titanium triethanolamine, titanium ammonium lactate, titanium ethyl lactate, and titanium octylene glycolate; tin compounds, such as dibutyltin dilaurate, dibutyltin oxide, and dibutyltin diacetate; metal acetates, such as magnesium acetate, calcium acetate, and zinc acetate; and metal oxides, such as antimony oxide and zirconium oxide. These catalysts can be used either individually or as a combination thereof.

If desired, the polyester plasticizer of the present invention may be obtained by using other materials in addition to the diol component (a), the organic dicarboxylic acid component (b), and the chain terminator (c). Usable other materials include hydroxy acids, such as 12-hydroxystearic acid, poly(12-hydroxystearic acid), 4-hydroxybenzoic acid, and poly(4-hydroxybenzoic acid); tri- or higher n-hydric alcohols, such as trimethylolethane, trimethylolpropane, hexitols, pentitols, glycerol, polyglycerol, pentaerythritol, dipentaerythritol, and tetramethylolpropane; and tricarboxylic acids, such as trimellitic acid and trimesic acid. The other materials are preferably used in a total amount of 10 molar parts or less per 100 molar parts of the total of the diol component (a), the organic dicarboxylic acid component (b), and the chain terminator (c).

The polyester plasticizer according to the present invention is preferably used for synthetic resins, particularly chlorine-containing resins.

The chlorine-containing resin composition according to the present invention comprises 100 parts by mass of a chlorine-containing resin, 10 to 100 parts by mass of the polyester plasticizer of the present invention, and 0 to 100 parts by mass of other additives.

The chlorine-containing resin includes polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymer, vinyl chloride-vinylidene chloride copolymers, vinyl chloride-styrene-maleic anhydride terpolymers, vinyl chloride-styrene-acrylonitrile terpolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-maleic ester copolymers, vinyl chloride-methacrylic ester copolymers, vinyl chloride-acrylonitrile copolymers, vinyl chloride-vinyl ether copolymers, and mixtures of two or more thereof. Further included are mixtures of these chlorine-containing resins and chlorine-free synthetic resins, such as acrylonitrile-styrene copolymers, acrylonitrile-styrene-butadiene terpolymers, ethylene-vinyl acetate copolymers, ethylene-ethyl(meth)acrylate copolymers, and polyesters, and block and graft copolymers composed of the chlorine-containing resin units and the chlorine-free resin units.

The amount of the polyester plasticizer in the chlorine-containing resin composition is such that can impart flexibility required for particular use to the resin. It is usually 10 to 100 parts by mass per 100 parts by mass of the chlorine-containing resin.

The other additives include commonly known ones, such as plasticizers other than the polyester plasticizers of the present invention, β-diketone compounds, electrical insulation improvers, various metal salts, polyols, epoxy compounds, organic phosphite compounds, phenol or sulfur antioxidants, ultraviolet absorbers, hindered amine light stabilizers, inorganic stabilizers, fillers, anti-fogging agents, anti-misting agents, stabilization assistants, and organotin compounds.

The plasticizers other than the polyester plasticizers of the present invention include phthalic acid plasticizers, such as dibutyl phthalate, butyl hexyl phthalate, diheptyl phthalate, dioctyl phthalate, diisononyl phthalate, diisodecyl phthalate, dilauryl phthalate, dicyclohexyl phthalate, and dioctyl terephthalate; adipic acid plasticizers, such as dioctyl adipate, diisononyl adipate, diisodecyl adipate, and di(butyl diglycol)adipate; tetrahydrophthalic acid plasticizers, azelaic acid plasticizers, sebacic acid plasticizers, stearic acid plasticizers, citric acid plasticizers, trimellitic acid plasticizers, pyromellitic acid plasticizers, and biphenylene polycarboxylic acid plasticizers. The amount of these plasticizers is preferably not more than 100 parts by mass per 100 parts by mass of the polyester plasticizer of the present invention.

The β-diketone compounds include dibenzoylmethane, benzoylacetone, stearoylbenzoylmethane, caproylbenzoylmethane, dehydroacetic acid, tribenzoylmethane, 1,3-bis(benzoylacetyl)benzene, and their metal salts (e.g., salts with lithium, sodium, potassium, calcium, magnesium, barium or zinc). The amount of the β-diketone compound to be added preferably ranges from 0.01 to 10 parts by mass per 100 parts by mass of the chlorine-containing resin. Amounts less than 0.01 part by mass produce insubstantial effects of addition. Addition of more than 10 parts by mass brings about no further improvement and can reduce heat resistance.

The electrical insulation improvers include those disclosed in JP-A-57-177040, JP-A-5-262943, JP-A-5-179090, and JP-A-9-324089, i.e., amorphous calcium silicate (hydrate), a composition containing α-dicalcium silicate hydrate and calcium hydroxide, and a silicate of aluminum or an alkaline earth metal. Preferred of them is amorphous calcium silicate (hydrate) for its superiority in insulation performance and heat resistance.

The amorphous calcium silicate (hydrate) includes tobermorite gel, C—S—H (I), and C—S—H (II). The amount of the amorphous calcium silicate (hydrate) to be added is preferably 0.001 to 3 parts by mass, still preferably 0.01 to 1 part by mass, per 100 parts by mass of the chlorine-containing resin. An amount less than 0.001 part by mass is little effective. Addition of more than 3 parts by mass can result in reduction of heat resistance or coloration.

The metal salts as an additive include metal (e.g., Li, Na, K, Ca, Ba, Mg, Sr, Zn, Cd, Sn, Cs, Al or organotin) salts of organic acids or phenols and metal (e.g., Li, Na, K, Ca, Ba, Mg, Sr, Cd, Sn, Cs, Al or organotin) salts of organic phosphoric acids. A preferred amount of the metal salt to be added is 0.05 to 10 parts by mass per 100 parts by mass of the chlorine-containing resin.

The organic acids of the metal salts include caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid, and like acids; naturally occurring mixtures of the above-recited organic acids, such as animal fat fatty acids, coconut oil fatty acid, tung oil fatty acid, soybean oil fatty acid, and cotton seed oil fatty acid; benzoic acid, p-tert-butylbenzoic acid, ethylbenzoic acid, isopropylbenzoic acid, toluic acid, xylylic acid, salicylic acid, 5-tert-octylsalicylic acid, naphthoic acid, cyclohexanecarboxylic acid, adipic acid, maleic acid, acrylic acid, and methacrylic acid. The phenols of the metal salts include phenol, cresol, ethylphenol, cyclohexylphenol, nonylphenol, and laurylphenol. The organic phosphoric acids of the metal salts include mono- or dioctylphosphoric acid, mono- or dilaurylphosphoric acid, mono- or distearylphosphoric acid, mono- or di(nonylphenyl)phosphoric acid, nonylphenyl phosphonate, and stearyl phosphonate.

Of these metal salts preferred are organic acid zinc salts and/or organic acid alkaline earth metal salts in view of anti-coloration, heat resistance, and cost.

The polyols include trimethylolpropane, ditrimethylolpropane, pentaerythritol, dipentaerythritol, polypentaerythritol, a stearic acid half ester with pentaerythritol or dipentaerythritol, bis(dipentaerythritol) adipate, glycerol, tris(2-hydroxyethyl)isocyanurate, sorbitol, mannitol, and trehalose.

The epoxy compounds include epoxidized animal or vegetable oils, such as epoxidized soybean oil, epoxidized linseed oil, epoxidized tung oil, epoxidized fish oil, epoxidized beef tallow oil, epoxidized castor oil, and epoxidized safflower oil; epoxidized methyl stearate, epoxidized butyl stearate, epoxidized 2-ethylhexyl stearate, epoxidized stearyl stearate, epoxidized polybutadiene, tris(epoxypropyl)isocyanurate, epoxidized tall oil fatty acid ester, epoxidized linseed oil fatty acid ester, vinylcyclohexene diepoxide, dicyclohexene diepoxide, 3,4-epoxycyclohexene methyl epoxycyclohexanecarboxylate, bisphenol A diglycidyl ether, trimethylolpropane polyglycidyl ether, glycerol polyglycidyl ether, hexanediol polyglycidyl ether, 2,2-dimethyl-1,3-propanediol polyglycidyl ether, hydrogenated bisphenol polyglycidyl ether, and cyclohexanedimethanol polyglycidyl ether.

The organic phosphite compounds include triphenyl phosphite, tris(2,4-di-t-butylphenyl)phosphite, tris(2,5-di-t-butylphenyl)phosphite, tris(nonylphenyl)phosphite, tris(dinonylphenyl)phosphite, tris(mono/di-mixed nonylphenyl) phosphite, diphenyl acid phosphite, 2,2'-methylenebis(4,6-di-t-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol).1,4-cyclohexanedimethyl diphosphite, bis(2,4-di-t-butylphenyl)pentaerythritol diphosphite, bis(2,5-di-t-butylphenyl)pentaerythritol diphosphite, bis(2,6-di-t-butyl-4-methylphenyl) penta-erythritol diphosphite, bis(2,4-dicumylphenyl) pentaerythritol diphosphite, distearyl-pentaerythritol diphosphite, tetra(C12-15 mixed alkyl)-4,4'-isopropylidenediphenyl phosphite, bis[2,2'-methylenebis(4,6-diamylphenyl)].isopropylidenediphenyl phosphite, tetratridecyl.4,4'-butylidenebis(2-t-butyl-5-methylphenol)diphosphite, hexa(tridecyl).1,1,3-tris(2-methyl-5-t-butyl-4-hydroxyphenyl)butane.triphosphite, tetrakis(2,4-di-t-butylphenyl) biphenylene diphosphonite, tris(2-[(2,4,7,9-tetrakis-t-butyldibenzo[d,f][1,3,2]dioxaphosphepin-6-yl)oxy]ethyl) amine, 9,10-dihydro-9-oxa-10-phospha-phenanthrene-10-oxide, and 2-butyl-2-ethylpropanediol.2,4,6-tri-t-butylphenol monophosphite.

The phenol antioxidants include 2,6-di-t-butyl-p-cresol, 2,6-diphenyl-4-octadecyloxyphenol, stearyl(3,5-di-t-butyl-4-hydroxyphenyl)propionate, distearyl(3,5-di-t-butyl-4-hydroxybenzyl)phosphonate, tridecyl 3,5-di-t-butyl-4-hydroxybenzyl-thioacetate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl) butyric acid]glycol ester, 4,4'-butylidenebis(2,6-di-t-butylphenol), 4,4'-butylidenebis(6-t-butyl-3-methylphenol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, tetrakis[methylene-3-(3,5-di-t-butyl-4-hydroxyphenyl)propionate] methane, 2-t-butyl-4-methyl-6-(2-acryloyloxy-3-t-butyl-5-methylbenzyl)phenol, 3,9-bis[2-(3-t-butyl-4-hydroxy-5-methylhydrocinnamoyloxy)-1,1-dimethylethyl]-2,4,8,10-tetraoxaspiro[5.5]undecane, and triethylene glycol bis[β-(3-t-butyl-4-hydroxy-5-methylphenyl)propionate].

The sulfur antioxidants include dialkyl thiodipropionates, such as a dilauryl, dimyristyl, myristylstearyl or distearyl ester of thiodipropionic acid; and polyol β-alkylmercaptopropionic acid esters, such as pentaerythritol tetra(β-dodecylmercaptopropionate).

The ultraviolet absorbers include 2-hydroxybenzophenones, such as 2,4-dihydroxybenzophenone, 2-hydroxy-4-methoxybenzophenone, 2-hydroxy-4-octyloxybenzophenone, 2-hydroxy-4-t-butyl-4'-(2-methacryloyloxyethoxyethoxy)benzophenone, and 5,5'-methylenebis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-t-octylphenyl)benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3-dodecyl-5-methylphenyl)benzotriazole, 2-(2-hydroxy-3-t-butyl-5-C7-9 mixed alkoxycarbonylethylphenyl)triazole, 2-(2-hydroxy-3,5-dicumylphenyl)benzotriazole, 2,2'-methylenebis(4-t-octyl-6-benzotriazolylphenol), and 2-(2-hydroxy-3-t-butyl-5-carboxyphenyl)benzotriazole polyethylene glycol ester; 2-(2-hydroxyphenyl)-1,3,5-triazines, such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octyloxyphenyl)-4,6-bis(2,4-dimethylphenyl)-1,3,5-triazine, and 2-(2-hydroxy-4-acryloyloxyethoxyphenyl)-4,6-bis(2,4-dimethylphenyl)-1,3,5-triazine; benzoates, such as phenyl salicylate, resorcinol monobenzoate, 2,4-di-t-butylphenyl-3,5-di-t-butyl-4-hydroxybenzoate, 2,4-di-t-amylphenyl 3,5-di-t-butyl-4-hydroxybenzoate, and hexadecyl 3,5-di-t-butyl-4-hydroxybenzoate; substituted oxanilides, such as 2-ethyl-2'-ethoxyoxanilide and 2-ethoxy-4'-dodecyloxanilide; and cyanoacrylates, such as ethyl α-cyano-β,β-diphenylacrylate and methyl 2-cyano-3-methyl-3-(p-methoxyphenyl)acrylate.

The hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, bis(2,2,6,6-tetramethyl-4-piperidyl).bis(tridecyl)-1,2,3,4-butanetetracarboxylate, bis(1,2,2,6,6-pentamethyl-4-piperidyl).bis(tridecyl)-1,2,3,4-butanetetracarboxylate, bis(1,2,2,6,6-pentamethyl-4-piperidyl)-2-butyl-2-(3,5-di-t-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-t-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino-s-triazin-6-ylamino]undecane, 1,6,11-tris[2,4-bis(N-butyl-N-(1,2,2,6,6-pentamethyl-4-piperidyl)amino-s-triazin-6-ylamino]undecane, 3,9-bis[1,1-dimethyl-2-[tris(2,2,6,6-tetramethyl-4-piperidyloxycarbonyloxy)butylcarbonyloxy]ethyl]-2,4,8,10-tetraoxaspiro[5.5]undecane, and 3,9-bis[1,1-dimethyl-2-[tris(1,2,2,6,6-pentamethyl-4-piperidyloxycarbonyloxy)butylcarbonyloxy]ethyl]-2,4,8,10-tetraoxaspiro[5.5]undecane.

The inorganic stabilizers include hydrotalcite, calcium phosphate, calcium oxide, calcium hydroxide, calcium silicate, magnesium phosphate, magnesium oxide, magnesium hydroxide, aluminum hydroxide, non-crystalline aluminosilicates, alkali metal and/or alkaline earth metal aluminosilicates having a zeolite crystal structure, silica powders, overbased calcium carbonate, sodium perchlorate, magnesium perchlorate, and barium perchlorate.

Hydrotalcite recited above is a complex salt compound composed of (i) magnesium and/or an alkali metal and aluminum or (ii) zinc, magnesium, and aluminum as represented by formula (I) shown below, of which the water of crystallization may be removed.

$$Mg_{x1}Zn_{x2}Al_2(OH)_{2(x1+x2)+4}(CO_3)_{1/2}\cdot mH_2O \tag{I}$$

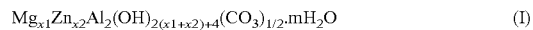

wherein x1 and x2 each represent a number satisfying formulae: $0 \leq x2/x1 < 10$ and $2 \leq x1+x2 \leq 20$; and m represents 0 or a positive number.

The hydrotalcite may be coated with a higher fatty acid, e.g., stearic acid, a higher fatty acid metal salt, e.g., an alkali metal oleate, an organic sulfonic acid metal salt, e.g., an alkali metal dodecylbenzenesulfonate, a higher fatty acid amide, a higher fatty acid ester, a wax, etc.

The hydrotalcite may be either a naturally occurring product or a synthetic product. Hydrotalcite can be synthesized by known processes described, e.g., in JP-B-46-2280, JP-B-50-30039, JP-B-51-29129, JP-B-3-36839, JP-A-61-174270, and JP-A-5-179052. Any hydrotalcite species can be used with no limitation on crystal structure, crystal grain size, and the like.

The fillers include calcium carbonate, silica, clay, glass beads, mica, sericite, glass flake, asbestos, wollastonite, potassium titanate, PMF, gypsum whisker, xonotlite, MOS, phosphate fiber, glass fiber, carbon fiber, and aramid fiber.

The antifogging agents include polyoxyethylene lauryl ether, polyoxyethylene stearyl ether, polyoxyethylene nonylphenyl ether, polyethylene glycol monopalmitate, polyethylene glycol monostearate, polyoxyethylene sorbitan monolaurate, polyoxyethylene sorbitan monopalmitate, glycerol monolaurate, glycerol monopalmitate, glycerol monostearate, glycerol monooleate, pentaerythritol monolaurate, sorbitan monopalmitate, sorbitan monobehenate, sorbitan distearate, diglycerol dioleate sodium laurylsulfate, sodium dodecylbenzenesulfonate, sodium butylnaphthalenesulfonate, cetyltrimethylammonium chloride, dodecylamine hydrochloride, lauric acid laurylamidoethyl phosphate, triethylcetylammonium iodide, oleylaminodiethylamine hydrochloride, and dodecylpyridinium salts.

The anti-misting agents include fluorine-containing compounds, such as anionic fluorine-containing surfactants, cationic fluorine-containing surfactants, amphoteric fluorine-containing surfactants, nonionic fluorine-containing surfactants, and fluorine-containing oligomers.

The stabilization assistants include diphenylthiourea, diphenylurea, anilinodithiotriazine, melamine, benzoic acid, cinnamic acid, p-tert-butylbenzoic acid, and aliphatic organic acids.

The organotin compounds include a dilaurate, a dimaleate, a dimercaptide or a maleate polymer of dibutyltin or dioctyltin.

In addition to the above-described components, the resin composition can further contain other additives according to necessity. Usable other additives include those commonly added to chlorine-containing resins, such as crosslinking agents, antistatics, thixotropic agents, anti-plate-out agents, surface treating agents, lubricants, flame retardants, fluorescent agents, antifungal agents, antibacterial agents, metal deactivators, parting agents, pigments, processing aids, antioxidants, light stabilizers, and blowing agents.

The chlorine-containing resin composition of the present invention can contain the other additives in an amount usually up to 100 parts by mass per 100 parts by mass of the chlorine-containing resin.

The chlorine-containing resin composition of the invention that contains the polyethylene plasticizer of the invention is useful as constructional materials, such as wall materials, floor materials, window frames, and wall paper; wire covering materials; automotive interior or exterior materials; agricultural materials, such as hothouses and tunnels; food (e.g., fishes) packaging materials, such as wraps and trays; coatings; and other miscellaneous goods, such as hoses, pipes, sheets, toys, gloves, and so forth.

The present invention will now be illustrated in greater detail with reference to Preparation Examples and Examples, but it should be understood that the invention is not construed as being limited thereto.

Preparation Examples 1 to 3 hereinafter given are to show examples of the polyester plasticizers of the present invention, and Examples 1 to 3 hereinafter given are to demonstrate examples of the chlorine-containing resin composition of the present invention which contains the polyester plasticizer of the present invention obtained in Preparation Examples 1 to 3. Comparative Preparation Examples 1 to 2 hereinafter described are to show polyester plasticizers synthesized without using 3-methyl-1,5-pentanediol. Comparative Examples 1 and 2 are intended to show chlorine-containing resin compositions containing the polyester plasticizers obtained in Comparative Preparation Examples 1 and 2.

PREPARATION EXAMPLE 1

In a reaction flask were put 1.7 molar parts of 2-methyl-1,3-propanediol, 1.2 molar parts of 3-methyl-1,5-pentanediol, 3.0 molar parts of adipic acid, 1.1 molar parts of isononanol, and 0.0005 molar parts of titanium tetraisopropoxide and allowed to react at 220° C. in a nitrogen stream for 8 hours while removing produced water by evaporation and then under a pressure of 4000 Pa at 220° C. for 1 hour to give polyester plasticizer No. 1, which was found to have an average molecular weight of 1800 and a viscosity of 3000 mPa.s.

PREPARATION EXAMPLE 2

In a reaction flask were put 1.7 molar parts of 2-methyl-1,3-propanediol, 0.6 molar parts of 3-methyl-1,5-pentanediol, 0.6 molar parts of neopentyl glycol, 3.0 molar parts of adipic acid, 1.2 molar parts of 2-ethylhexanol, and 0.0005 molar parts of titanium tetraisopropoxide and allowed to react at 220° C. in a nitrogen stream for 8 hours while removing produced water by evaporation and then under a pressure of 4000 Pa at 220° C. for 1 hour to give polyester plasticizer No. 2 having an average molecular weight of 1700 and a viscosity of 3000 mPa.s.

PREPARATION EXAMPLE 3

In a reaction flask were put 1.8 molar parts of 2-methyl-1,3-propanediol, 0.6 molar parts of 3-methyl-1,5-pentanediol, 0.6 molar parts of neopentyl glycol, 3.0 molar parts of adipic acid, 0.3 molar parts of 12-hydroxystearic acid, 1.2 molar parts of 2-ethylhexanol, and 0.0005 molar parts of titanium tetraisopropoxide and allowed to react at 220° C. in a nitrogen stream for 8 hours while removing produced water by evaporation and then under a pressure of 4000 Pa for 1 hour to give polyester plasticizer No. 3 having an average molecular weight of 1900 and a viscosity of 3000 mPa.s.

COMPARATIVE PREPARATION EXAMPLE 1

In a reaction flask were put 2.9 molar parts of 2-methyl-1,3-propanediol, 3.0 molar parts of adipic acid, 1.1 molar parts of isononanol, and 0.0005 molar parts of titanium tetraisopropoxide and allowed to react at 220° C. in a nitrogen stream for 8 hours while removing produced water by evaporation and then under a pressure of 4000 Pa at 220° C. for 1 hour to give polyester plasticizer No. 4 having an average molecular weight of 1600 and a viscosity of 3000 mPa.s.

COMPARATIVE PREPARATION EXAMPLE 2

In a reaction flask were put 1.7 molar parts of 2-methyl-1,3-propanediol, 1.2 molar parts of neopentyl glycol, 3.0 molar parts of adipic acid, 1.1 molar parts of 2-ethylhexanol, and 0.0005 molar parts of titanium tetraisopropoxide and allowed to react at 220° C. in a nitrogen stream for 8 hours while removing produced water by evaporation and then under a pressure of 4000 Pa at 220° C. for 1 hour to give polyester plasticizer No. 5 having an average molecular weight of 1700 and a viscosity of 3000 mPa.s.

EXAMPLES 1 TO 3

Components shown in the following formulation, including each of the polyester plasticizer Nos. 1 to 3 obtained in Preparation Examples 1 to 3, were compounded into a chlorine-containing resin composition, which was kneaded on rolls at 170° C. at 30 rpm for 7 minutes. The compound was pressed at 180° C. for 5 minutes to prepare a 1 mm thick sheet. The sheet was evaluated by a tensile test (JIS K71132) and an oil resistance test (ASTM-No. 2, oil; 100° C., 96 hrs). The test results are shown in Table 1.

Formulation (Unit: Part by Weight):

| | |
|---|---|
| Polyvinyl chloride resin (degree of polymerization: 1050) | 100 |
| Polyester plasticizer (see Table 1) | 50 |
| Epoxidized soybean oil | 2 |
| Adekastab 1500 (phosphite compound available from Asahi Denka Co., Ltd.) | 0.5 |
| 2-Ethylhexanoic acid | 0.02 |
| Barium carbonate | 0.2 |
| Zinc p-tert-butylbenzoate | 0.05 |
| Zinc m-toluylate | 0.05 |
| Barium stearate | 1 |
| Zinc stearate | 0.4 |
| Hydrotalcite (DHT-4A available from Kyowa Chemical Industry Co., Ltd.) | 0.4 |
| Dibenzoylmethane | 0.1 |
| Bisphenol A | 0.14 |

COMPARATIVE EXAMPLES 1 AND 2

A sheet was prepared in the same manner as in Example 1, except for using each of polyester plasticizer Nos. 4 and 5 obtained in Comparative Preparation Examples 1 and 2 as a polyester plasticizer. The sheet was evaluated by a tensile test and an oil resistance test in the same manner as in Example 1. The test results obtained are shown in Table 1.

TABLE 1

|  | Polyester Plasticizer | Tensile Test | | | Oil Resistance Test | |
|---|---|---|---|---|---|---|
|  |  | 100% Modulus (MPa) | Elongation (%) | Tensile Strength (MPa) | Elongation Retention (%) | Tensile Strength Retention (%) |
| Ex. 1 | No. 1 | 11.5 | 370 | 22.8 | 99 | 105 |
| Ex. 2 | No. 2 | 12.0 | 360 | 23.0 | 99 | 110 |
| Ex. 3 | No. 3 | 11.8 | 362 | 23.3 | 100 | 105 |
| Comp. Ex. 1 | No. 4 | 13.9 | 348 | 25.1 | 94 | 95 |
| Comp. Ex. 2 | No. 5 | 13.3 | 322 | 24.6 | 86 | 86 |

As is apparent from the results in Table 1, the resin compound containing the polyester plasticizer of the present invention exhibits a lower 100% modulus and a higher elongation than those containing the equal amount of the polyethylene plasticizer synthesized without using 3-methyl-1,5-pentanediol while retaining sufficient tensile strength. Thus, the polyester plasticizer according to the present invention has now proved to achieve excellent plasticization efficiency. It has also been confirmed that the chlorine-containing resin composition containing the polyester plasticizer of the invention exhibits satisfactory retention percentage in elongation and tensile strength in the oil resistance test, proving excellent in oil resistance.

INDUSTRIAL APPLICABILITY

The polyester plasticizer according to the present invention exhibits high plasticization efficiency and imparts excellent oil resistance to synthetic resins, particularly chlorine-containing resins.

The invention claimed is:

1. A polyvinyl chloride resin composition, comprising:
   100 parts by mass of a polyvinyl chloride resin,
   10 to 100 parts by mass of a polyester plasticizer, and
   0 to 100 parts by mass of an additive,
   and wherein said polyester plasticizer has an average molecular weight of 500 to 5000 and is obtained by the reaction of (a) a diol component comprising 100 molar parts of 2-methyl-1,3-propanediol, 10 to 100 molar parts of 3-methyl-1,5-pentanediol, and 0 to 1000 molar parts of an additional aliphatic diol, (b) an organic dicarboxylic acid component comprising 100 molar parts of adipic acid and 0 to 100 molar parts of an additional organic dicarboxylic acid, and (c) a chain terminator comprising a monovalent aliphatic alcohol or a monovalent aliphatic organic acid.

2. The polyester plasticizer according to claim 1, wherein the amount of 3-methyl-1,5-pentanediol is 20 to 100 molar parts, and the amount of the additional aliphatic diol is 0 to 200 molar parts.

3. The polyester plasticizer according to claim 1, which has an average molecular weight of 1000 to 3000.

* * * * *